(12) United States Patent
Norbits

(10) Patent No.: US 7,237,788 B1
(45) Date of Patent: Jul. 3, 2007

(54) BOAT LOADING SYSTEM

(76) Inventor: G. Theodore Norbits, 12 Southbrooke Pl., Mt. Zion, IL (US) 62549

(*) Notice: Subject to any disclaimer, the term of this patent is extended or adjusted under 35 U.S.C. 154(b) by 220 days.

(21) Appl. No.: 11/188,672

(22) Filed: Jul. 25, 2005

Related U.S. Application Data

(60) Provisional application No. 60/602,938, filed on Aug. 19, 2004.

(51) Int. Cl.
*B60P 3/10* (2006.01)

(52) U.S. Cl. .................................. 280/414.1; 114/343

(58) Field of Classification Search ............ 280/414.1; 410/2; 114/343, 218
See application file for complete search history.

(56) References Cited

U.S. PATENT DOCUMENTS

| | | | |
|---|---|---|---|
| 2,587,208 A | 2/1952 | Peterson ................ 280/33.13 |
| 3,632,138 A * | 1/1972 | Whiteley, Jr. ............ 280/405.1 |
| 3,750,805 A * | 8/1973 | Finney ........................ 414/536 |
| 3,953,055 A | 4/1976 | Stark ........................... 280/504 |
| 4,114,920 A * | 9/1978 | Boettcher ................ 280/414.1 |
| 4,641,851 A * | 2/1987 | Knies ....................... 280/414.1 |
| 4,995,629 A * | 2/1991 | Poppell .................... 280/414.1 |
| 5,263,733 A * | 11/1993 | Kastenberger et al. ... 280/414.1 |
| 5,895,185 A * | 4/1999 | Spence ......................... 410/77 |
| 6,584,922 B1 | 7/2003 | Fritz et al. ..................... 114/44 |
| 6,619,687 B2 | 9/2003 | Goby .......................... 280/508 |
| 6,904,861 B1 * | 6/2005 | Warner et al. ............... 114/344 |

* cited by examiner

*Primary Examiner*—Kevin Hurley
(74) *Attorney, Agent, or Firm*—Philip L. Bateman

(57) ABSTRACT

A system enables a boat to be loaded from water onto a trailer that is partially submerged on a ramp at the edge of the water. One part of the system is a connector that is mounted on the keel of the bow. Another part of the system is a transversely mounted removable pin that is positioned on the trailer.

16 Claims, 4 Drawing Sheets

Fig. 3
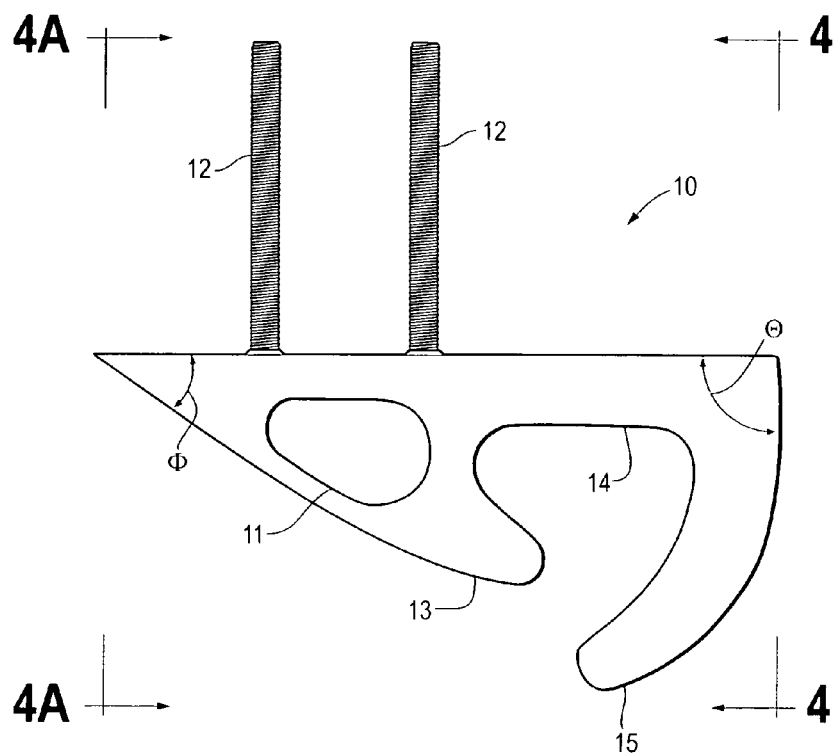
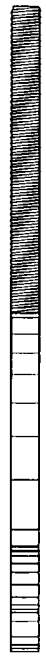
Fig. 4A
Fig. 4

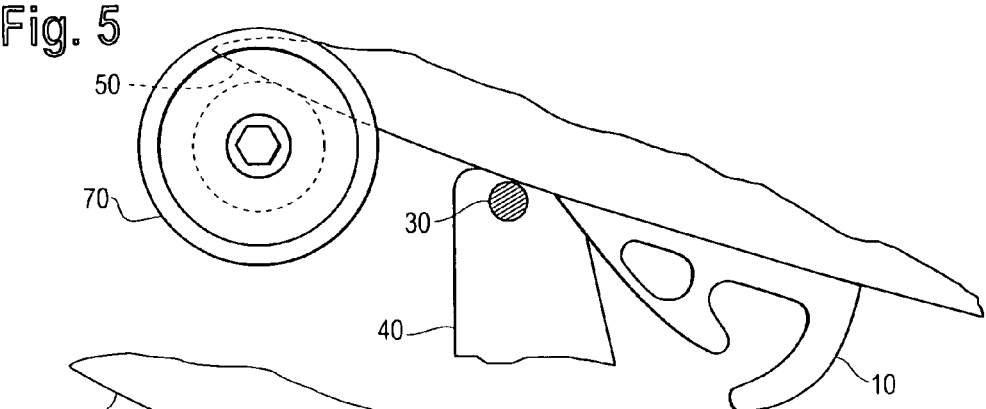
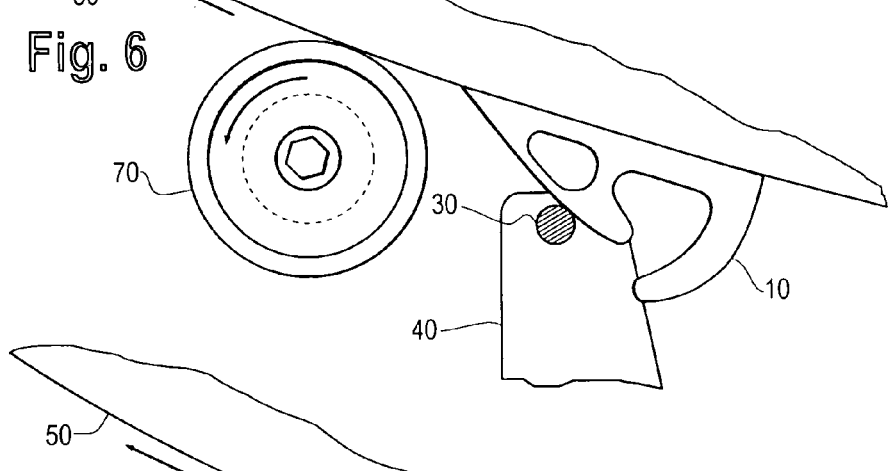
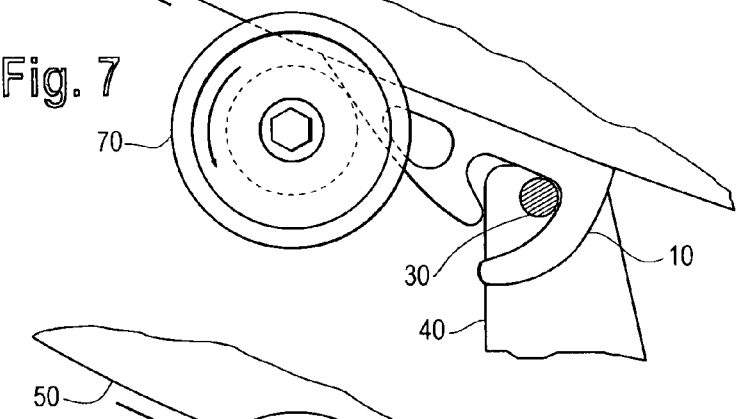
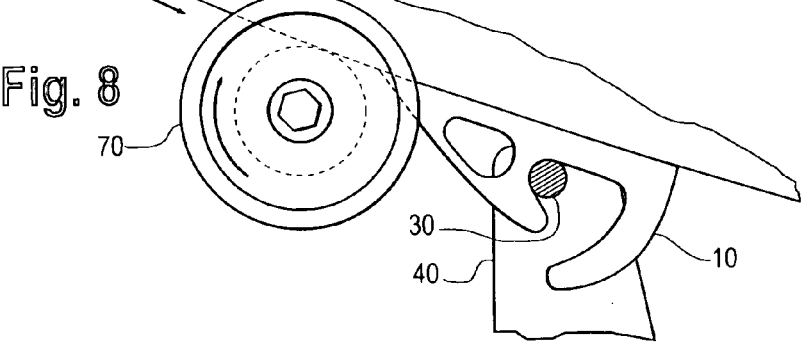

BOAT LOADING SYSTEM

CROSS-REFERENCE TO RELATED APPLICATION

This application claims the benefit of U.S. Provisional Application Ser. No. 60/602,938, filed Aug. 19, 2004.

FIELD OF THE INVENTION

This invention relates to a system for loading a boat from the water onto a trailer.

BACKGROUND OF THE INVENTION

A variety of recreational activities are enjoyed on boats. The term "boat" is used herein to include all forms of watercraft. While some boats are stored on docks, others are stored on trailers that are pulled by motor vehicles. The term "trailer" is used herein to include all portable holders for boats. Trailers typically contain padded supports upon which the boat rests, a roller at the front of the trailer to support the bow and to center the boat on the trailer, and a winch to secure the boat. Many bodies of water contain paved ramps with side walkways for launching and loading boats on trailers. To launch a boat, the trailer is backed down the ramp into the water until the boat floats off the supports of the trailer. The boat is then unhooked from the winch and the trailer is pulled away.

To load the boat, the trailer is backed down the ramp into the water. One of two methods is then used to position the boat onto the trailer. In the first method, referred to herein as the "dead loading" system, the boat is driven over the trailer and then the motor is turned off. The boat is then held in a forward position by one or more persons standing on the side walkways. The boat is then secured in the forward position by connecting the line from the winch to a fitting, commonly known as a bow eye, on the bow of the boat. The winch is then turned to tighten the connection. As the trailer is pulled up the ramp, the boat settles upon the supports. In the second method, referred to herein as the "power loading" method, the boat is driven over the trailer and then left in forward gear at idle to keep the boat in the forward position until the winch can be secured to the bow eye and tightened. The power loading method is prohibited at some locations because it tends to wash out sand at the bottom of the water around the ramp. The washed out sand tends to accumulate and form sand bars a short distance away from the ramp. The sand bars interfere with boats as they approach the ramp.

The boat launching and loading process is usually performed by two or more people. However, many people, especially fishermen, boat by themselves. The "dead loading" method is difficult for the boater to perform by himself because the boater must hold the boat in the forward position as he simultaneously attaches the winch to the bow eye. The "power loading" method is somewhat easier, but is dangerous. After the trailer is backed down the ramp, the boater drives the boat forward over the trailer, leaves the motor running and the transmission in forward gear to hold the boat in position, and then leaves the driver's seat to go to the bow of the boat to connect the winch to the bow eye. Some boaters crawl onto the deck of the boat to reach the bow while others climb out of the boat and reach the bow from the side walkways. The boater must then climb back into the driver's seat to turn off the motor. It would be much safer, faster, and easier if the boat could be driven upon the trailer and secured automatically.

A variety of coupling systems are shown in the prior art, including Peterson, U.S. Pat. No. 2,587,208, issued Feb. 26, 1952; Stark, U.S. Pat. No. 3,953,055, issued Apr. 27, 1976; Fritz et al., U.S. Pat. No. 6,584,922, issued Jul. 1, 2003; and Goby, U.S. Pat. No. 6,619,687, issued Sep. 16, 2003. However, none of the coupling systems enable a single person to load a boat onto a trailer without having to leave and then return to the driver's seat.

Accordingly, a demand exists for a boat loading system that enables a single person to load a boat onto a trailer without having to climb out and then return to the driver's seat. A demand also exists for a boat loading system that can be used for dead loading or power loading.

SUMMARY OF THE INVENTION

The general object of this invention is to provide an improved boat loading system.

I have invented an improved system for loading a boat from the water onto a trailer that is partially submerged on a ramp at the edge of the water. The system comprises: (a) a boat having a keel at its bow, the boat having a connector mounted on the keel at the bow, the connector having an upper finger that extends downwardly and away from the keel at an angle of about 10 to 50 degrees and a lower finger that extends upwardly and away from the keel at an angle of about 30 to 90 degrees, the upper finger and the lower finger each having a distal end, the distal end of the lower finger being below and spaced apart from the distal end of the first finger, the upper finger and the lower finger being joined by a base that mates with the keel, the space between the upper finger and the lower finger defining a cavity; and (b) a trailer having a transversely mounted removable pin that is positioned to engage the upper finger as the boat drives forward upon the trailer such that the pin enters the cavity of the connector and such that the pin is retained in the cavity as the boat moves back upon the trailer.

I have also invented a method of loading a boat from water having a keel that runs from its bow to its stern onto a trailer that is partially submerged on a ramp at the edge of the water. The method comprises: (a) mounting a connector on the boat at the keel at the bow, the connector having an upper finger that extends downwardly and away from the keel at an angle of about 10 to 50 degrees and a lower finger that extends upwardly and away from the keel at an angle of about 30 to 90 degrees, the upper finger and the lower finger each having a distal end, the distal end of the lower finger being below and spaced apart from the distal end of the first finger, the upper finger and the lower finger being joined by a base that mates with the keel, the space between the upper finger and the lower finger defining a cavity; (b) mounting a transversely mounted removable pin on the trailer, the pin being positioned to engage the upper finger as the boat drives forward upon the trailer; (c) moving the boat forward onto the trailer until the pin enters the cavity of the connector; and (d) moving the boat backward until the pin is retained in the cavity.

The boat loading system of this invention enables a boat to be driven upon a trailer and secured automatically. This, in turn, enables a single person to load the boat onto a trailer without having to leave and then return to the driver's seat. The boat loading system can be used for dead loading by simply removing the pin.

BRIEF DESCRIPTION OF THE DRAWINGS

FIG. 3 is a side view of the bow connector.

FIG. 4A is a front view of the bow connector.

FIG. 4 is a rear view of the bow connector.

FIG. 5 is a side elevation view showing a first position as a boat is loaded.

FIG. 6 is a side elevation view showing a second position as the boat is loaded.

FIG. 7 is a side elevation view showing a third position as the boat is loaded.

FIG. 8 is a side elevation view showing a fourth position as the boat is loaded.

DETAILED DESCRIPTION OF THE INVENTION

Figure 1:
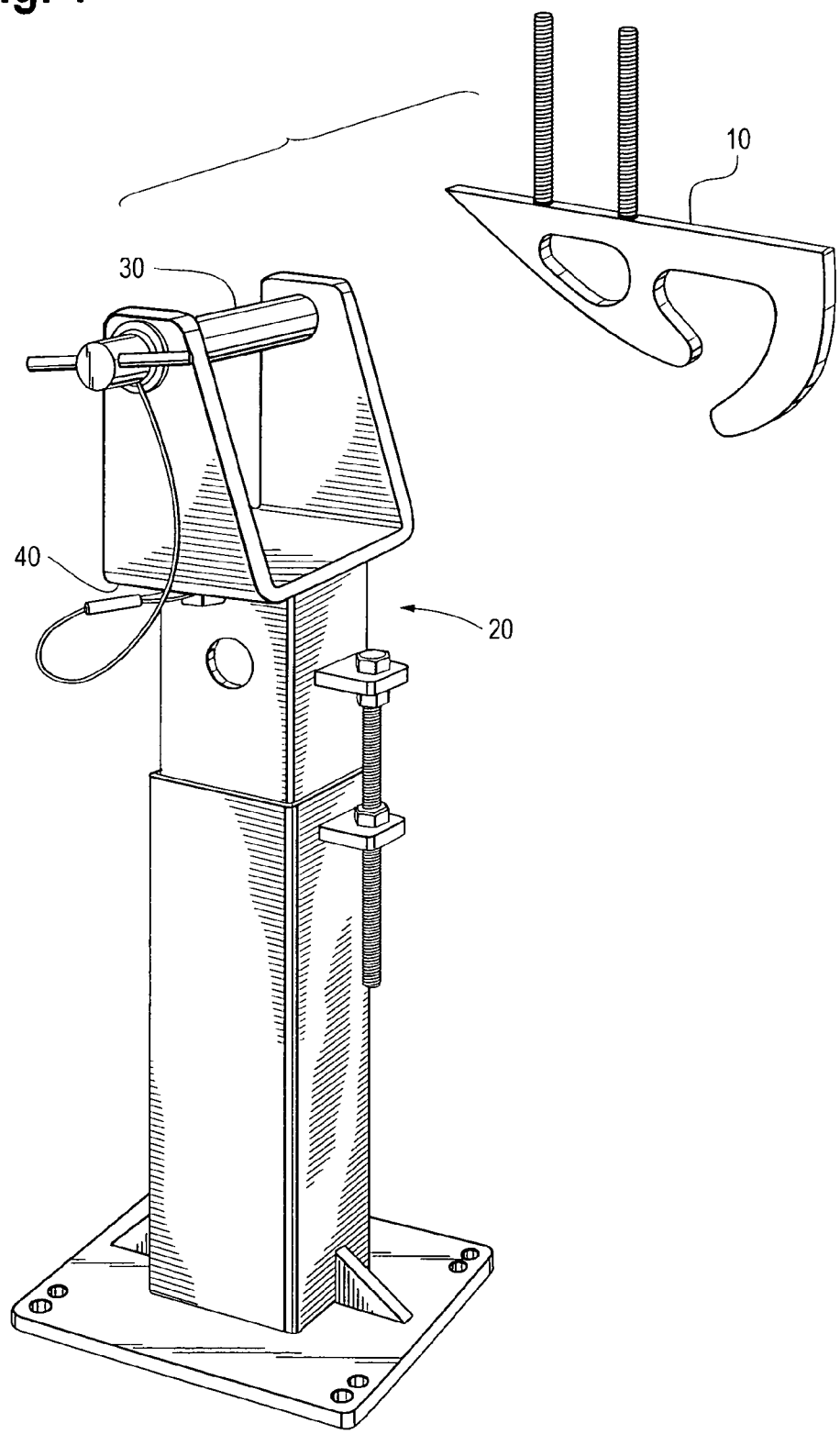
FIG. 1 is a perspective view of the bow connector and trailer assembly of the preferred embodiment of the boat loading system of this invention.
Figure 2:
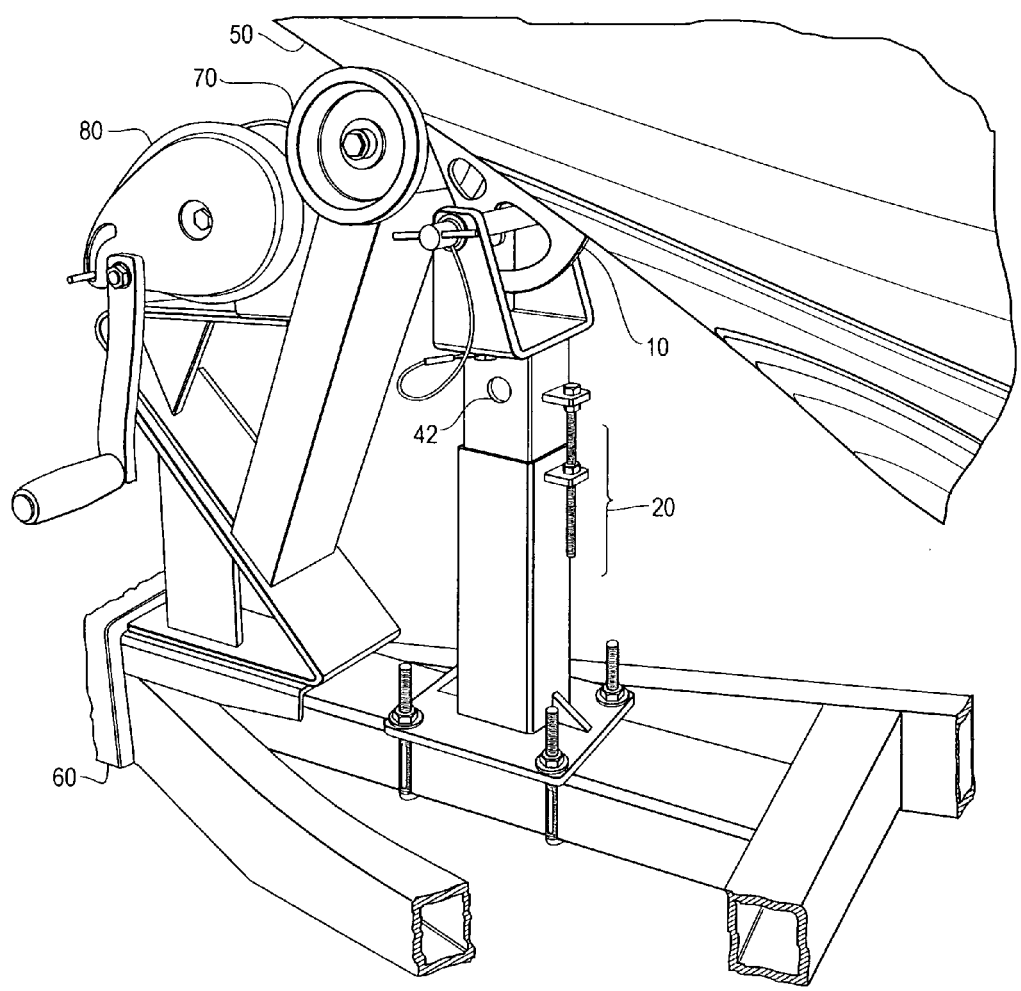
FIG. 2 is a perspective view of the boat loading system installed on a boat and a trailer.

This invention is best understood by reference to the drawings. Referring to FIG. 1, the boat loading system of this invention comprises a bow connector 10 and a trailer assembly 20. The trailer assembly, in turn, comprises a pin 30 in a pin support 40. Referring to FIG. 2, the bow connector is mounted on the keel at the bow of a boat 50 and the trailer assembly is mounted on a trailer 60. The trailer contains a conventional roller 70 and a conventional winch 80 located a short distance in front of the roller. These components are discussed in more detail below.

Referring to FIGS. 3, 4A, and 4, the bow connector 10 is a fitting made of steel or the like that is mounted on the keel at the bow of the boat. The connector generally has parallel sides and a thickness of about one-eighth to one inch. The connector preferably has a thickness of about one-fourth to one-half inch. The preferred embodiment of the connector contains a hole 11 for connection to the winch and thus replaces the conventional bow eye. To facilitate the replacement, the preferred embodiment of the connector contains two threaded posts 12 that fit into holes in the keel that are used for attachment of the conventional bow eye. If desired, the conventional bow eye can be retained and the connector can be mounted behind it. The particular manner in which the connector is mounted to the keel is not critical.

The connector can be considered to have three sections. The first section is an upper finger 13 that extends downwardly and away from the keel at an angle φ (relative to the keel) of about 10 to 50 degrees, preferably about 20 to 40 degrees, and most preferably about 30 to 35 degrees. The keel itself slopes upwardly at the bow. The upper finger of the connector begins at the keel and then preferably slopes downwardly and away from the keel for a distance of about two to six inches, preferably about four inches, then curves inwardly (toward the keel) about 180 degrees, and then extends upwardly for about one-half to two inches, preferably about one inch.

The second section of the connector is a base portion 14 that mates with the keel and extends downwardly and substantially parallel to the keel for a distance of about one to three inches, preferably about two inches.

The third section of the connector is a lower finger 15 that extends upwardly and away from the keel at an angle θ (relative to the bow) of about 30 to 90 degrees, preferably about 60 to 90 degrees. The lower finger most preferably extends upwardly and away from the keel at an angle of about 90 degrees and then curves gradually to an angle of about 40 to 60 degrees. The lower finger extends for a distance of about one to five inches, preferably about four inches, then curves inwardly (toward the keel) about 180 degrees, and then slopes downwardly and toward the keel for a distance of about two to four inches, preferably about three inches, and then ends at the base portion. The distal end of the lower finger is below and spaced apart from the distal end of the upper finger. The space between the upper finger, the base, and the lower finger defines a cavity into which the pin enters during loading.

The second component of the boat loading system is a trailer assembly 20 that mounts to the trailer. The manner in which the trailer assembly mounts to the trailer is not critical and depends, in part, on the trailer itself. In the preferred embodiment, two U-shaped bolts are used to secure the base of the trailer assembly to the trailer. The trailer assembly has a transversely mounted removable pin 30 that rests in a pin support 40. In the preferred embodiment, the pin support contains two sets of holes. The pin is held in the upper set of holes 41 as the boat is loaded. The pin remains in the upper set of holes during transport and storage to provide a supplementary means (in addition to the winch) for holding the boat on the trailer. Before the boat is launched, the pin is moved to the lower set of holes 42. Alternatively, the pin is part of a cam mechanism that is moved from an upper position where it engages the connector to a lower position where it does not engage the connector.

The dimensions of the pin are a matter of choice. The pin generally has a length of about four to eight inches, preferably about five to seven inches, and a diameter of about three-eighths to five-eighths inches, preferably about one-half inch. It preferably has a spring mechanism, such as a ball-lock, to hold it in place in the pin support. In the preferred embodiment, the pin is free to rotate when contacted by the connector. The rotation helps to reduce friction between the two parts. Friction-reducing materials and coatings are added to the connector and/or the pin if additional friction reduction is desired.

The pin support preferably contains a means for allowing the pin to move a short distance (about one-half to two inches) upward relative to the trailer. This "play" is desirable when the boat is transported because the boat tends to move a short distance upward when the trailer moves over bumps. Much less stress is placed on the connector and the trailer assembly if this play is allowed. In the preferred embodiment, the play is achieved with an upper telescoping section that is free to move a short distance relative to the lower section. A bolt passes through brackets in the two sections. Two nuts are threaded on the bolt and tightened against the top and the bottom of the lower bracket. A third nut is threaded on the bolt and positioned so that a short distance is left between the upper bracket and the head of the bolt. This space is not shown in the drawings. This space allows the upper telescoping section to move upward a short distance until the head of the bolt is contacted by the upper bracket.

A further variation is to place a coil spring around the bolt, below the upper bracket, and above the third nut, while still leaving a space between the upper bracket and the head of the bolt. The spring acts as a shock absorber and allows some movement in the downward direction. This shock absorption is beneficial when transporting the boat. As will become apparent, the downward movement is also beneficial when the boat is loaded onto the trailer and when the pin is removed prior to launching. A preferred spring is a steel spring having a length of about one inch, made of wire having a diameter of about 0.1 inches, and having a rate range of about 60 to 100 pounds per inch.

The operation of the boat loading system can now be considered. Referring to FIG. 5, a boat 50 is shown being driven upon a trailer. The roller 70, the pin 30, and the top of the pin support 40 are shown, but the rest of the trailer is omitted for illustration. In FIG. 5, the keel of the boat has just made contact with the roller while the connector 10 has not yet made contact with the pin. In FIG. 6, the boat is continuing to move forward. The connector has now made contact with the pin and is moving forward upon it. There is now a space between the boat and the roller.

In FIG. 7, the boat has moved forward until the pin reaches the cavity of the connector. The boat drops down by the force of gravity and the pin contacts the back of the cavity which prevents any further forward movement of the boat. The boater can feel the drop of the boat and the restriction on further forward movement. If desired, a proximity sensor connected to a visual display on the dashboard can provide an additional indication that the pin is retained in the connector. The person in the boat now shuts off power to the motor or moves the transmission into reverse gear. With the power turned off or the transmission in reverse, the boat slides back on the trailer as shown in FIG. 8 until the pin contacts the front of the cavity. The pin is now locked in place and the boat again rests on the roller. The boater can now leave the boat and attach the winch to the connector. When the boat is ready to be launched, the pin is removed from the upper set of holes and placed into the lower set of holes for storage.

The entire process can easily be performed by a single person. The locking of the connector onto the pin is performed automatically as the boat is driven upon the trailer. Thus, there is no need for the boater to climb out of the driver's seat, make an attachment, and then climb back into the driver's seat. And, even if two or more persons are present, the loading process is much easier and faster. As previously discussed, this method of loading is known as "power loading" because the engine is on and the transmission is in forward gear. Another advantage is that the system can also be used in "dead loading" simply by moving the pin to the lower set of holes. Dead loading is required at some ramps and is also necessary if the motor malfunctions or runs out of fuel. The pin is thus out of the way and the boat can be loaded as if the system were not present.

I claim:

1. A system for loading a boat from water onto a trailer that is partially submerged on a ramp at the edge of the water, the system comprising:
   (a) a boat having a keel at its bow, the boat having a connector mounted on the keel at the bow, the connector having an upper finger that extends downwardly and away from the keel at an angle of about 10 to 50 degrees and a lower finger that extends upwardly and away from the keel at an angle of about 30 to 90 degrees, the upper finger and the lower finger each having a distal end, the distal end of the lower finger being below and spaced apart from the distal end of the first finger, the upper finger and the lower finger being joined by a base that mates with the keel, the space between the upper finger and the lower finger defining a cavity; and
   (b) a trailer having a transversely mounted removable pin that is positioned to engage the upper finger as the boat moves forward upon the trailer such that the pin enters the cavity of the connector and such that the pin is retained in the cavity as the boat moves back upon the trailer.

2. The system of claim 1 wherein the pin has a length of about four to eight inches and a diameter of about three-eighths to five-eighths inches.

3. The system of claim 2 wherein the pin is rotatable.

4. The system of claim 3 additionally comprising a means for enabling the pin to move up and down relative to the trailer.

5. The system of claim 4 wherein the connector contains a hole for connection to a winch on the trailer.

6. A method of loading a boat from water having a keel that runs from its bow to its stern onto a trailer that is partially submerged on a ramp at the edge of the water, the method comprising:
   (a) mounting a connector on the boat at the keel at the bow, the connector having an upper finger that extends downwardly and away from the keel at an angle of about 10 to 50 degrees and a lower finger that extends upwardly and away from the keel at an angle of about 30 to 90 degrees, the upper finger and the lower finger each having a distal end, the distal end of the lower finger being below and spaced apart from the distal end of the first finger, the upper finger and the lower finger being joined by a base that mates with the keel, the space between the upper finger and the lower finger defining a cavity;
   (b) mounting a transversely mounted removable pin on the trailer, the pin being positioned to engage the upper finger as the boat drives forward upon the trailer;
   (c) moving the boat forward onto the trailer until the pin enters the cavity of the connector; and
   (d) moving the boat backward until the pin is retained in the cavity.

7. The method of claim 6 wherein pin has a length of about four to eight inches and a diameter of about three-eighths to five-eighths inches.

8. The method of claim 7 wherein the pin is rotatable.

9. The method of claim 8 wherein the pin is mounted on the trailer with a means for enabling the pin to move up and down relative to the trailer.

10. The method of claim 9 wherein the connector contains a hole for connection to a winch on the trailer.

11. The method of claim 10 wherein the connector is mounted to the keel at the same position a bow eye had been previously mounted.

12. A system for loading a boat from water onto a trailer that is partially submerged on a ramp at the edge of the water, the system comprising:
   (a) a boat having a keel at its bow, the boat having a connector mounted on the keel at the bow, the connector having parallel sides and a thickness of about one-half to three inches, a top surface that mates with the keel, and a bottom surface that comprises: (i) a first portion that begins at the keel and then slopes downwardly and away from the keel for a distance of about two to six inches to a first point; (ii) a first inward curve of about 180 degrees; (iii) a second portion that extends upward to the keel for about one-half to two inches; (iv) a second inward curve of about 180 degrees; (v) a third portion that extends downwardly and substantially parallel to the keel for a distance of about one to three inches; (vi) an outward curve of about 180 degrees; (vii) a fourth portion that extends upwardly and away from the keel for a distance of about one to four inches to a second point that is located behind and below the first point; (viii) a second outward curve of about 180 degrees; and (ix) a fifth portion that slopes downwardly and toward the keel for a distance of about two to five inches and then ends at the keel; and (b) a trailer having a transversely mounted removable pin that is positioned to engage the upper finger as the boat moves forward upon the trailer such that the pin enters the cavity of the connector and such that the pin is retained in the cavity as the boat moves back upon the trailer.

13. The system of claim 12 wherein the pin has a length of about four to eight inches and a diameter of about three-eighths to five-eighths inches.

14. The system of claim 13 wherein the pin is rotatable.

15. The system of claim 14 additionally comprising a means for enabling the pin to move up and down relative to the trailer.

16. The system of claim 15 wherein the connector contains a hole for connection to a winch on the trailer.

* * * * *